United States Patent
Rash et al.

(10) Patent No.: US 7,242,685 B1
(45) Date of Patent: Jul. 10, 2007

(54) SYSTEM AND METHOD FOR INITIATING MULTILINK FRAGMENT REASSEMBLY

(75) Inventors: Joseph Rash, Wake Forrest, NC (US); Daniel Yingling, Apex, NC (US); Robert Oden, Raleigh, NC (US)

(73) Assignee: Applied Micro Circuits Corporation, San Diego, CA (US)

( * ) Notice: Subject to any disclaimer, the term of this patent is extended or adjusted under 35 U.S.C. 154(b) by 1086 days.

(21) Appl. No.: 10/288,130

(22) Filed: Nov. 5, 2002

(51) Int. Cl.
 *H04L 12/56* (2006.01)
 *H04J 3/24* (2006.01)
(52) U.S. Cl. .................. 370/394; 370/474; 370/476
(58) Field of Classification Search ............... 370/394, 370/428, 412–418, 473–476
See application file for complete search history.

(56) References Cited

U.S. PATENT DOCUMENTS

| | | | |
|---|---|---|---|
| 6,791,982 B2 * | 9/2004 | Westberg | 370/392 |
| 6,876,669 B2 * | 4/2005 | Shalom | 370/468 |
| 7,027,443 B2 * | 4/2006 | Nichols et al. | 370/394 |

OTHER PUBLICATIONS

Sklower, et al, "The PPP Multilink Protocol (MP)," RFC 1990, Network Working Group, Aug. 1996, pp. 1-24.*

FRF.16, Multilink Frame Relay UNI/NNI Implementation Agreement, Frame Relay Forum Technical Commitee, Aug. 1999, pp. 1-48.*

* cited by examiner

*Primary Examiner*—Chi Pham
*Assistant Examiner*—Tri H. Phan
(74) *Attorney, Agent, or Firm*—Law Office of Gerald Maliszewski; Gerald Maliszewski

(57) ABSTRACT

A system and method are provided for initiating the reassembly of received packet fragments in a multilink communication network. The method comprises: receiving packet fragments with corresponding sequence numbers; counting the number of fragments received since the initiation of a pervious packet fragment reassembly; and, initiating packet fragment reassembly in response to the fragment count. Some aspects of the method further comprise: establishing a threshold; and, comparing the fragment count to the threshold. Then, initiating packet fragment reassembly includes initiating packet fragment reassembly when the fragment count equals the threshold. Other aspects of the method comprise tracking a RFC-1990 M value. Then, establishing a threshold includes establishing a WITH_M_UPDATE threshold. Initiating packet fragment reassembly includes initiating packet fragment reassembly in response to the combination of: the fragment count equaling the WITH_M_UPDATE threshold; and, the M value changing since the initiation of a pervious packet fragment reassembly.

12 Claims, 5 Drawing Sheets

SYSTEM AND METHOD FOR INITIATING MULTILINK FRAGMENT REASSEMBLY

BACKGROUND OF THE INVENTION

1. Field of the Invention

This invention generally relates to serial data and optical communication networks and, more particularly, to a system and method for more efficiently initiating packet reassembly in a multilink communication network.

2. Description of the Related Art

Packets, or packetized groupings of digital information can be transmitted using multilink network protocols such as MLFR, Multi Link Frame Relay, or MLPPP, Multi Link Point to Point Protocol. These multilink protocols allow the aggregation of multiple physical channels, T1/E1 links for example, into a single virtual link called a bundle. This ability to aggregate links allows a network to increase its bandwidth beyond a T1/E1 rate without having to purchase a T3 line. On the transmitting end of a network employing the multilink protocol, packets are fragmented, given a multilink header, which includes a sequence number, and transmitted on any of the links that compose the bundle. Each link is an independent link that may or may not share a common geographical path with other links.

At the receiving end of a multilink network, packet fragments are resequenced using the sequence number contained in the multilink header and recombined into the original packet. Since each link of a bundle may have a different geographical path, the arrival order will likely not match the transmission order. Reassembly of these fragments into the original packet requires memory and processing resources. Determining whether a packet fragment is late, due to transmission time differences between links, or lost due to network errors can quickly and accurately be performed using a value called M. However, determining when to begin reassembly of fragments can significantly affect network performance because of inherent memory bandwidth and processing resource limitations.

In multilink systems, a decision must be made to determine if a late arriving packet is lost. Request for Comments (RFC)-1990 is a specification defining an algorithm that determines when a late arriving packet can accurately be considered lost using a calculated value labeled "M". As defined in RFC-1990, which was advanced to standard status by the Internet Engineering Task Force in December 1999, a single twelve or twenty-four bit value must be maintained for each link within a bundle.

Conventional implementations of the multilink protocol reassemble packet fragments after all fragments for the packet have arrived. In a typical Internet flow of packets this method can result in processing fragments in a bursty pattern. This bursty processing pattern can easily overwhelm processing resources resulting in network delays and excessive memory usage.

It would be advantageous if received multilink packet fragments could be reassembled more efficiently.

It would be advantageous if these received packet fragments could be reassembled with a minimum of memory usage or processing delays.

SUMMARY OF THE INVENTION

In multilink systems, a decision must be made to determine the start of the reassembly process for packet fragments that have arrived via one or more network connections. Since the resource bandwidth is shared, reassembly performance is limited by a reassembly process that is initiated too frequently. However, processing resources limit reassembly performance if reassembly is initiated too infrequently. This present invention system and method provide a means of initiating fragment reassembly without overwhelming processing resources or shared resource access. This invention can be implemented in software or dedicated hardware.

Accordingly, a method is provided for initiating the reassembly of received packet fragments in a multilink communication network. The method comprises: receiving packet fragments with corresponding sequence numbers; counting the number of fragments received since the initiation of a pervious packet fragment reassembly; and, initiating packet fragment reassembly in response to the fragment count.

Some aspects of the method further comprise: establishing a threshold; and, comparing the fragment count to the threshold. Then, initiating packet fragment reassembly includes initiating packet fragment reassembly when the fragment count equals the threshold.

Other aspects of the method comprise tracking a RFC-1990 M value. Then, establishing a threshold includes establishing a WITH_M_UPDATE threshold. Comparing the fragment count to the threshold includes comparing the fragment count to the WITH_M_UPDATE threshold. Initiating packet fragment reassembly includes initiating packet fragment reassembly in response to the combination of: the fragment count equaling the WITH_M_UPDATE threshold; and, the M value changing since the initiation of a pervious packet fragment reassembly.

In other aspects, a WITHOUT_M UPDATE threshold is established and compared to the fragment count. Then, the packet fragment reassembly is initiated in response to the combination of: the fragment count equaling the WITHOUT_M_UPDATE threshold; and, the M value not changing since the initiation of a pervious packet fragment reassembly.

In other aspects, the method comprises: establishing a timeout count; and, counting the elapsed time since the initiation of a pervious packet fragment reassembly. Then, the packet fragment reassembly is initiated in response to the elapsed time equaling the timeout count.

Additional details of the above-described method and a multilink communication network system for initiating the reassembly of received packet fragments are provided below.

DETAILED DESCRIPTION OF THE PREFERRED EMBODIMENTS

Figure 1:
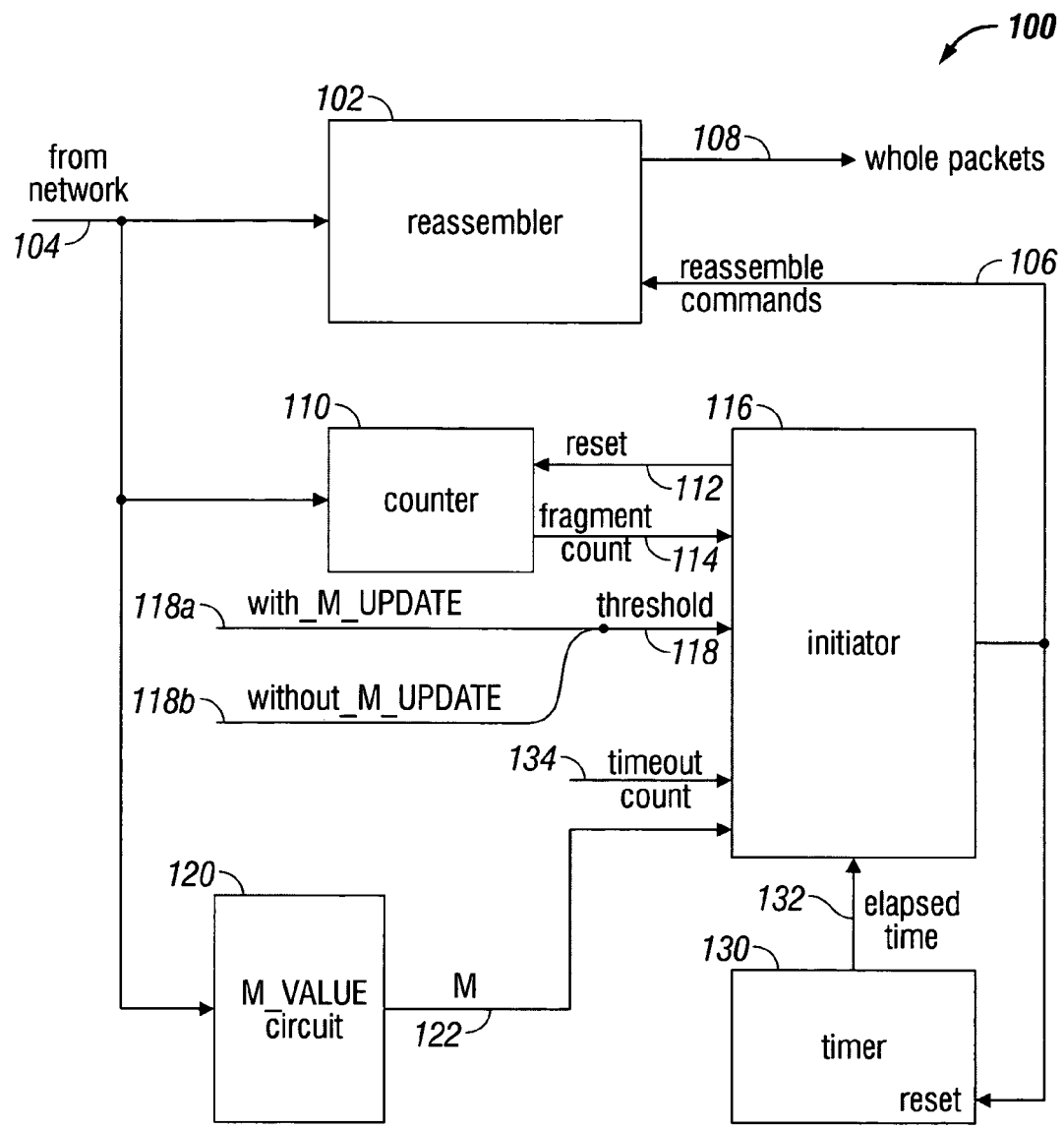
FIG. 1 is a schematic block diagram of the present invention system for initiating the reassembly of received packet fragments in a multilink communication network.

FIG. 1 is a schematic block diagram of the present invention system for initiating the reassembly of received packet fragments in a multilink communication network. The system 100 comprises a reassembler 102 having an input port on a multilink communication network, represented by line 104, to receive packet fragments with corresponding sequence numbers. A packet fragment, as defined herein, is a portion of a packet. Packets are commonly organized into frames of header information, including the fragment sequence number, and data information. So a packet fragment is a frame or a set of frames identified by a sequence number. The reassembler 102 reassembles packet fragments, in response to reassembly commands received at an input on line 106, and supplies whole (completely reassembled) packets at an output on line 108.

A counter 110 has an input connected to the multilink communication network on line 104 to count the number of fragments. The counter 110 has an input on line 112 to reset the counter and an output on line 114 to supply the fragment count.

An initiator 116 has an input connected to the counter output on line 114. The initiator 116 has an output to supply reassembly commands to the reassembler on line 106 and an output on line 112 to reset the counter in response to the fragment count on line 114. In some aspects, the initiator 116 has an input on line 118 to accept a threshold value. The initiator 116 compares the fragment count to the threshold and supplies reassembly commands on line 106 when the fragment count equals the threshold.

Some aspects of the system 100 further comprise an M_value circuit 120 having an input connected to the multilink communication network on line 104 and an output on line 122 to supply RFC-1990 M values. The M value is typically the conventional value of M, as defined in RFC-1990. The initiator 116 has input an input on line 122 to accept the M values and an input on line 118a to accept a WITH_M_UPDATE threshold. The initiator 116 compares the fragment count to the WITH_M_UPDATE threshold and supplies reassembly commands in response to the combination of the following two events: the fragment count equaling the WITH_M_UPDATE threshold; and, the M value changing since a pervious reassembly command.

In other aspects of the system 100, the initiator 116 accepts a WITHOUT_M_UPDATE threshold on line 118b and compares the fragment count to the WITHOUT_M_UPDATE threshold. Then, the initiator 116 supplies reassembly commands on line 106 in response to the following combination of events: the fragment count equaling the WITHOUT_M_UPDATE threshold; and, the M value not changing since a pervious reassembly command.

Some aspects of the system 100 further comprise a timer 130 having a reset input on line 106 responsive to reassembly commands from the initiator 116. The timer 130 has an output on line 132 to supply the elapsed time since a pervious reassembly command. The initiator 116 has an input on line 132 to accept the elapsed time from the timer 130 and an input on line 134 to accept a timeout count. The initiator 116 supplies reassembly commands on line 106 in response to the elapsed time equaling the timeout count.

Typically, the value of the WITHOUT_M_UPDATE threshold on line 118b exceeds the value of the WITH_M UPDATE threshold 118a. As explained in more detail below, the reassembly command can be seen to be issued primarily in response to a number fragments that have been received with an M update, secondarily is response to receiving a number of fragments without an M update, and as a last resort, in response to a timeout. Although the system 100 has been represented by a combination of blocks that imply hardware circuits, it should be understood that either part, or all of the invention could be enabled with corresponding software routines.

Functional Description

This present invention algorithm determines when multilink fragments are to be reassembled and processed. The system permits fragments to be processed regardless of arrival order, or the ration of received to unreceived packet fragments. Since fragment processing is distributed over time, greater processing and shared resource utilization efficiency is achieved.

'The variables:

PARSE_THRESHOLD_WITH_M_UPDATE: The number of fragments that have been received since the last fragment processing has been initiated is compared to this threshold. Fragment processing is initiated if the count reaches this threshold and the M value (as defined in RFC-1990) has changed since the last fragment processing has been initiated. PARSE_THRESHOLD_WITHOUT_M_UPDATE: threshold regardless of whether or not the M value (as defined in RFC-1990) has changed since the last fragment processing has been initiated.

PARSE_TIMEOUT_COUNT: A time value that determines when to process fragments if the arrival of fragments has not triggered a threshold initiated processing of fragments.

FRAGMENT_COUNTER: A counter used to record the number of fragments that have arrived at the destination system.

TIMEOUT_COUNTER: A counter used to measure elapsed time.

The algorithm:
If a fragment has arrived:
  If the fragment count has reached the PARSE_THRESHOLD_WITH_M_UPDATE threshold and M has changed since the last reassembly of fragment:
    Initiate fragment processing for the destination system associated with the fragment.
    Reset the FRAGMENT_COUNTER.
    Reset the TIMEOUT_COUNTER.
  Else, if the fragment count has reached the PARSE_THRESHOLD_WITHOUT_UPDATE threshold:
    Initiate fragment processing for the destination system associated with the fragment.
    Reset the FRAGMENT_COUNTER.
    Reset the TIMEOUT_COUNTER.
  Else
    Increment the FRAGMENT_COUNTER.
If the TIMEOUT_COUNTER has reached the PARSE_TIMEOUT_COUNT value:
  If the FRAGMENT_COUNTER is not equal to zero:
    Initiate fragment processing for the system that has timed out.

Reset the FRAGMENT_COUNTER.
Reset the TIMEOUT_COUNTER.
Else:
Reset the TIMEOUT COUNTER.

The present invention system decreases network latency. Processing and memory resources are utilized more consistently, thus avoiding memory and processing limitations that slow network traffic. The invention also increases network efficiency. The avoidance of memory and processing limitations produces a more consistent flow of traffic that does not stress the limits of networking equipment. The present invention decreases memory usage. Since fragment processing is performed prior to the arrival of all fragments of a packet, the memory associated with the processed fragments can be released for use, before the remaining packet fragments arrive. Further, the present invention is simple to implement. Conventional algorithms are more complex in that they must determine when all fragments associated with a packet have been received.

Figure 2:
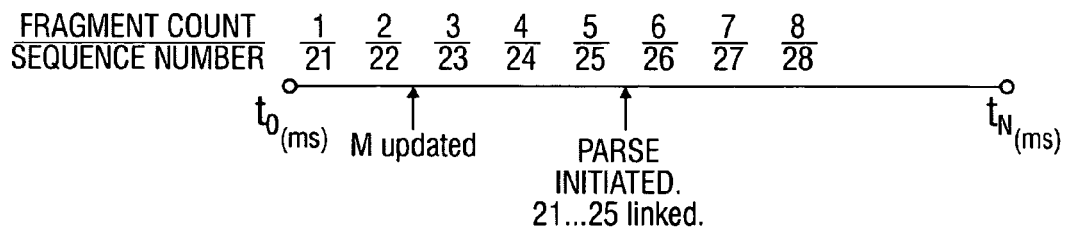
FIG. 2 is a drawing that represents a scenario where the reassembly process in initiated in response to the WITH_M_UPDATE threshold.

FIG. 2 is a drawing that represents a scenario where the reassembly process in initiated in response to the WITH_M_UPDATE threshold. A timeline is shown. The WITH_M_UPDATE threshold is set to 5 (fragments) and the WITHOUT_M_UPDATE threshold is set to eight (fragments). The TIMEOUT_COUNT is set to 3 milliseconds (ms). The ratios above the timeline represents an accumulated fragment count (above) and the sequence number of the last received fragment (below). After the receipt of the second fragment (sequence number 22), an M update is received. After the receipt of the fifth fragment, the reassembly process is initiated (parse initiated) for sequence numbers 21 through 25 in response to the M value being updated and the fragment count equaling the WITH_M_UPDATE threshold of 5.

Figure 3:
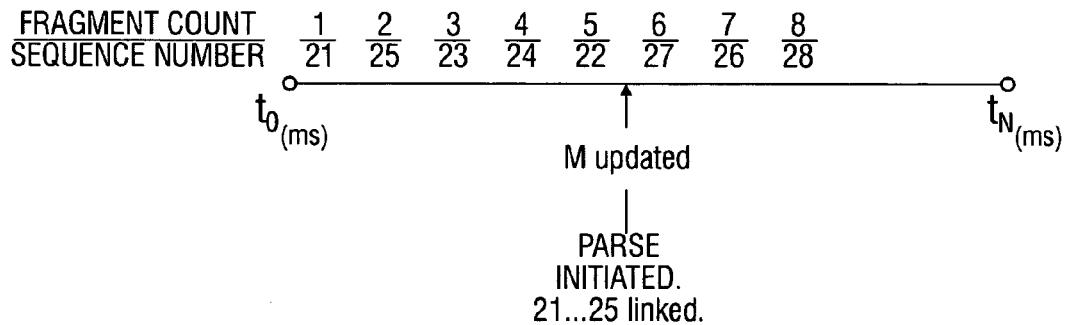
FIG. 3 is a drawing representing another scenario where the reassembly process in initiated in response to the WITH_M_UPDATE threshold.

FIG. 3 is a drawing representing another scenario where the reassembly process in initiated in response to the WITH_M_UPDATE threshold. The WITH_M_UPDATE threshold is set to 5 (fragments) and the WITHOUT M_UPDATE threshold is set to eight. The TIMEOUT_COUNT is set to 3 ms. After the receipt of the sixth fragment (sequence number 27), an M update is received. The received number of fragments already exceeds the threshold. The reassembly process is initiated (parse initiated) for sequence numbers 21 through 25 in response to the M value being updated and the fragment count equaling the WITH_M_UPDATE threshold of 5.

Figure 4:
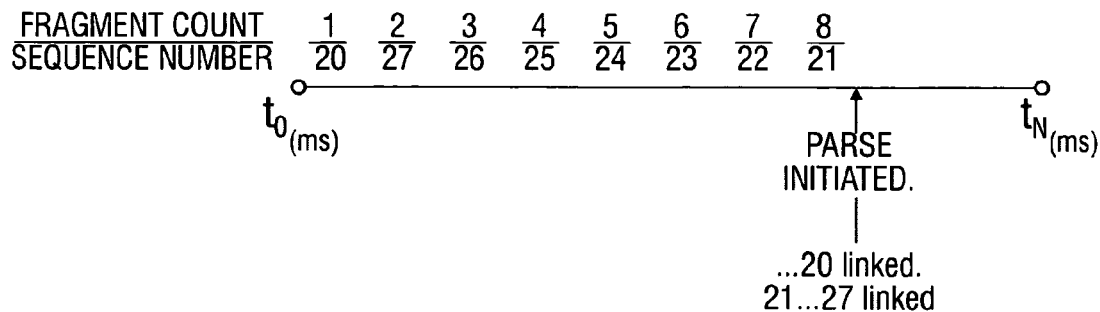
FIG. 4 is a drawing that represents a scenario where the reassembly process in initiated in response to the WITHOUT_M_UPDATE threshold.

FIG. 4 is a drawing that represents a scenario where the reassembly process in initiated in response to the WITHOUT_M_UPDATE threshold. The WITH_M_UPDATE threshold is set to 5 (fragments) and the WITHOUT_M_UPDATE threshold is set to eight. The TIMEOUT_COUNT is set to 3 ms. After the receipt of the eighth fragment (sequence number 21), the reassembly process is initiated (parse initiated) for sequence numbers 21 through 27 in response to the M value NOT being updated and the fragment count equaling the WITHOUT_M_UPDATE threshold of 8.

Figure 5:
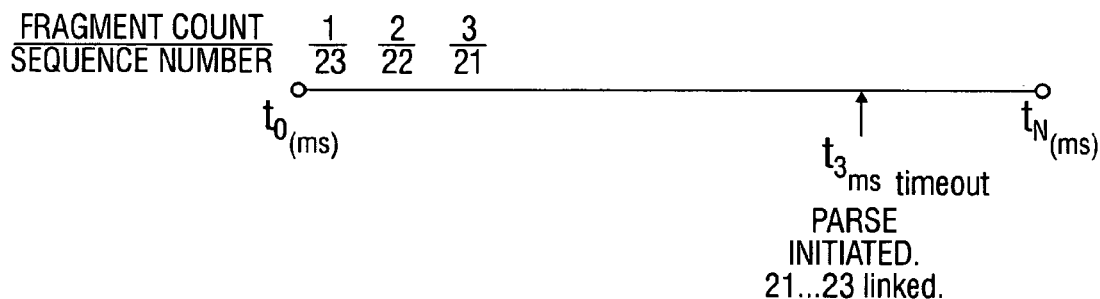
FIG. 5 is a drawing that represents a scenario where the reassembly process in initiated in response to the timeout.

FIG. 5 is a drawing that represents a scenario where the reassembly process in initiated in response to the timeout. The WITH_M_UPDATE threshold is set to 5 (fragments) and the WITHOUT_M_UPDATE threshold is set to eight. The TIMEOUT_COUNT is set to 3 ms. After the elapse of 3 ms, and the failure to trigger in response to the WITH_M_UPDATE and WITHOUT_M_UPDATE thresholds, the reassembly process is triggered for sequence numbers 21 through 23.

Figure 6:
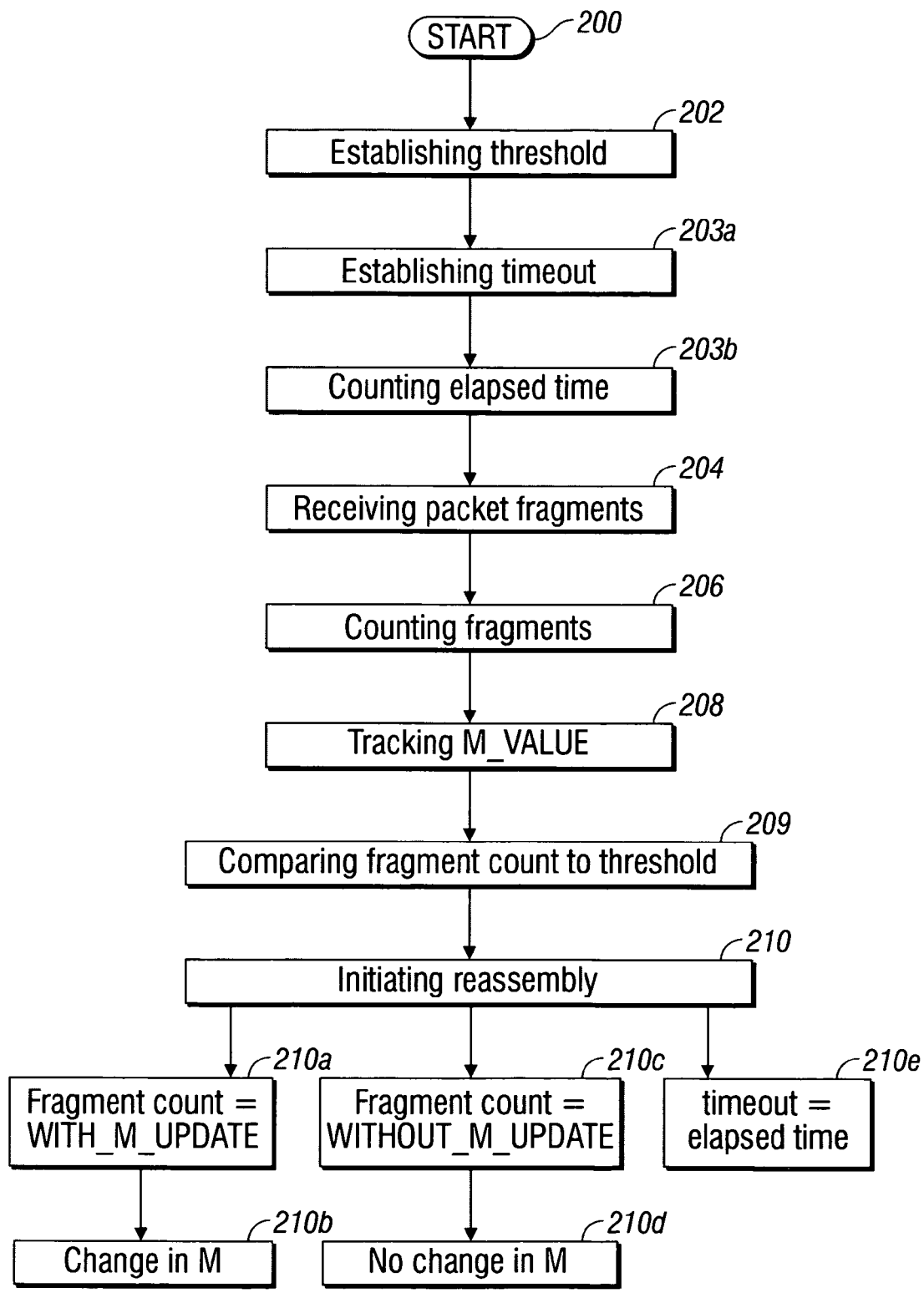
FIG. 6 is a flowchart illustrating the present invention method for initiating the reassembly of received packet fragments in a multilink communication network.

FIG. 6 is a flowchart illustrating the present invention method for initiating the reassembly of received packet fragments in a multilink communication network. Although the method (and the method below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 200.

Step 202 establishes a threshold. Step 204 receives packet fragments with corresponding sequence numbers. Step 206 counts the number of fragments received since the initiation of a pervious packet fragment reassembly. Step 208 tracks a RFC-1990 M value. Step 210 initiates packet fragment reassembly in response to the fragment count.

In some aspects of the method a further step, Step 209 compares the fragment count to the threshold. Then, initiating packet fragment reassembly in Step 210 includes initiating packet fragment reassembly when the fragment count equals the threshold.

In some aspects of the method, establishing a threshold in Step 202 includes establishing a WITH_M_UPDATE threshold. Then, comparing the fragment count to the threshold in Step 209 includes comparing the fragment count to the WITH_M_UPDATE threshold. Initiating packet fragment reassembly in Step 210 includes initiating packet fragment reassembly in response to substeps. Step 210a requires that the fragment count equal the WITH_M_UPDATE threshold. Step 210b requires that the M value has changed since the initiation of a pervious packet fragment reassembly.

In other aspects, establishing a threshold in Step 202 includes establishing a WITHOUT_M_UPDATE threshold. Typically, the value of the WITHOUT_M_UPDATE threshold exceeds the value of the WITH_M_UPDATE threshold. Then, comparing the fragment count to the threshold in Step 209 includes comparing the fragment count to the WITHOUT_M_UPDATE threshold. Initiating packet fragment reassembly in Step 210 includes initiating packet fragment reassembly in response to alternate substeps. Step 210c requires that the fragment count equal the WITHOUT_M_UPDATE threshold. Step 210d requires that the M value has not changed since the initiation of a pervious packet fragment reassembly.

In some aspects of the method there are further steps. Step 203a establishes a timeout count. Step 203b counts the elapsed time since the initiation of a pervious packet fragment reassembly. Then, initiating packet fragment reassembly in Step 210 alternately includes (Step 210e) initiating packet fragment reassembly in response to the elapsed time equaling the timeout count.

Figure 7:
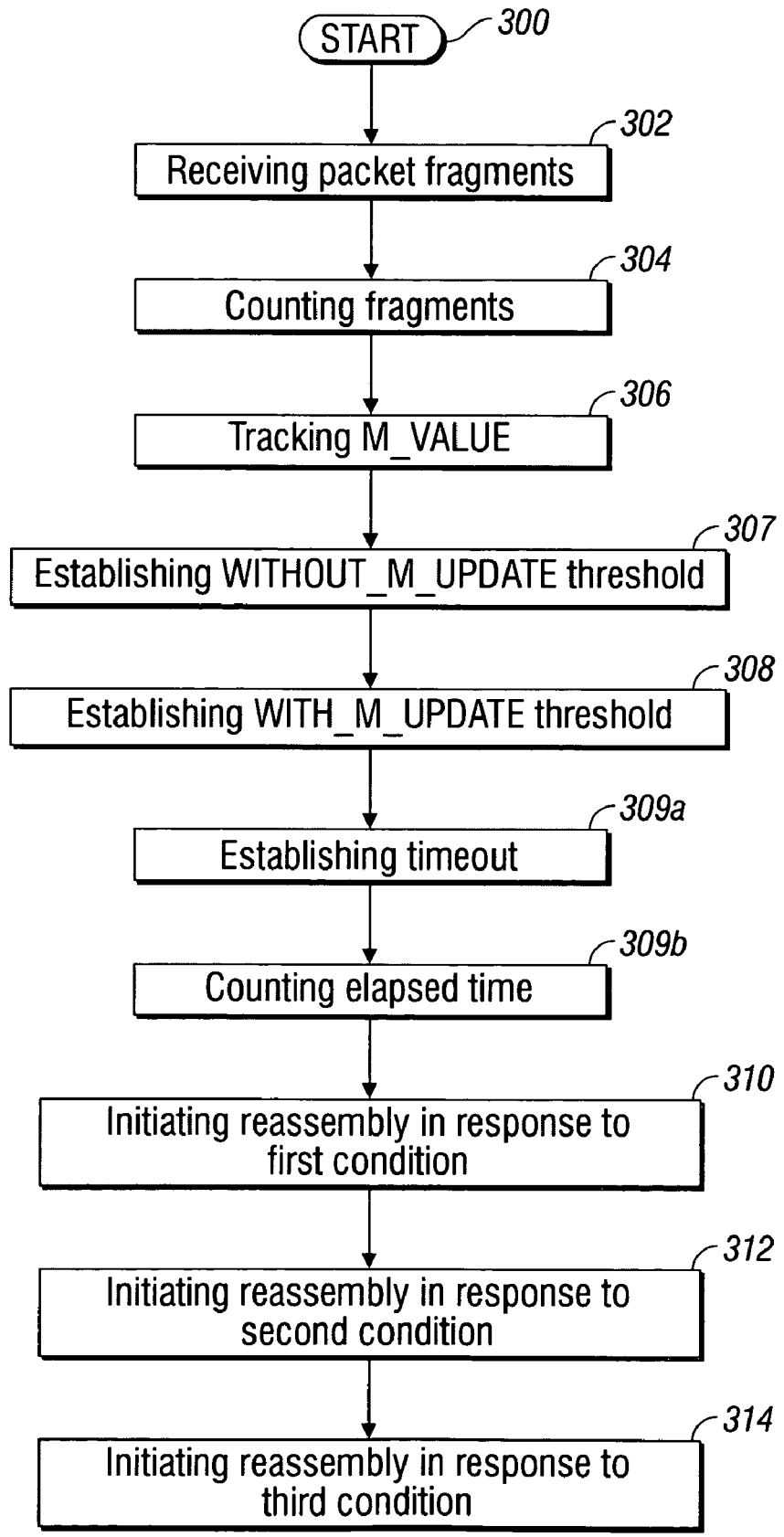
FIG. 7 is a flowchart illustrating a variation on the method for initiating the reassembly of received packet fragments presented in FIG. 6.

FIG. 7 is a flowchart illustrating a variation on the method for initiating the reassembly of received packet fragments presented in FIG. 6. The method starts at Step 300. Step 302 receives packet fragments with corresponding sequence numbers. Step 304 counts the number of fragments received since the initiation of a pervious packet fragment reassembly. Step 306 tracks a RFC-1990 M value. Step 308 establishes a WITH_M_UPDATE threshold. Step 310 initiates packet fragment reassembly in response to a first condition where: the fragment count equals the WITH_M_UPDATE threshold; and, the M value has changed since the initiation of a pervious packet fragment reassembly.

In some aspects a further step, Step 307 establishes a WITHOUT_M_UPDATE threshold. Then, Step 312 initiates packet fragment reassembly in response to a second condition if the first condition does not occur, the second condition being: the fragment count equals the WITHOUT_M_UPDATE threshold; and, the M value has not changed since the initiation of a pervious packet fragment reassembly. Typically, the value of the WITHOUT_M_UPDATE threshold exceeds the value of the WITH_M_UPDATE threshold.

Some aspects of the method include further steps. Step 309*a* establishes a timeout count. Step 309*b* counts the elapsed time since the initiation of a pervious packet fragment reassembly. Then, Step 314 initiates packet fragment reassembly in response to a third condition if the first and second conditions do not occur, the third condition being that the elapsed time equal the timeout count.

A system and method have been present for efficiently determining when to begin the packet fragment reassembly process in a multilink network. A few examples of the algorithm have been presented showing the relative relationships between the process thresholds. However, the present invention is not limited to any of these particular examples. Other variations and embodiments of the invention will occur to those skilled in the art.

We claim:

1. In a multilink communication network, a method for initiating the reassembly of received packet fragments, the method comprising:
   receiving packet fragments with corresponding sequence numbers;
   counting the number of fragments received since the initiation of a pervious packet fragment reassembly;
   tracking a RFC-1990 M value:
   establishing a WITH_M_UPDATE threshold:
   comparing the fragment count to the WITH_M_UPDATE threshold:
   initiating packet fragment reassembly in response to:
      the fragment count equaling the WITH_M_UPDATE threshold; and,
      the M value changing since the initiation of a pervious packet fragment reassembly.

2. The method of claim 1 further comprising:
   wherein establishing a threshold includes establishing a WITHOUT_M_UPDATE threshold;
   wherein comparing the fragment count to the threshold includes comparing the fragment count to the WITHOUT_M_UPDATE threshold; and,
   wherein initiating packet fragment reassembly includes initiating packet fragment reassembly in response to:
   the fragment count equaling the WITHOUT_M_UPDATE threshold; and,
   the M value not changing since the initiation of a pervious packet fragment reassembly.

3. The method of claim 1 further comprising:
   establishing a timeout count;
   counting the elapsed time since the initiation of a pervious packet fragment reassembly; and,
   wherein initiating packet fragment reassembly includes initiating packet fragment reassembly in response to the elapsed time equaling the timeout count.

4. The method of claim 1 further comprising:
   establishing a timeout count;
   counting the elapsed time since the initiation of a pervious packet fragment reassembly;
   establishing a WITHOUT_M_UPDATE threshold; and,
   wherein initiating packet fragment reassembly includes initiating packet fragment reassembly in response to:
   the elapsed time equaling the timeout count;
   the fragment count equaling the WITHOUT_M_UPDATE threshold and the M value not changing since the initiation of a pervious packet fragment reassembly; and,
   the fragment count equaling the WITH_M_UPDATE threshold and the M value changing since the initiation of a pervious packet fragment reassembly.

5. The method of claim 4 wherein the value of the WITHOUT_M_UPDATE threshold exceeds the value of the WITH_M_UPDATE threshold.

6. In a multilink communication network, a system for initiating the reassembly of received packet fragments, the system comprising:
   a reassembler having an input port on a multilink communication network to receive packet fragments with corresponding sequence numbers, the reassembler reassembling packet fragments, in response to reassembly commands received at an input, and supplying whole packets at an output;
   an M value circuit having an input connected to the multilink communication network and an output to supply RFC-1990 M values;
   a counter having an input connected to the multilink communication network to count the number of fragments, an input to reset the counter, and an output to supply the fragment count; and,
   an initiator having an input connected to the counter output, an input to accept a WITH_M_UPDATE threshold value, and an input to accept the M values, the initiator comparing the fragment count to the WITH_M_UPDATE threshold and having outputs to reset the counter in response to the fragment count and to supply reassembly commands to the reassembler in response to:
   the fragment count equaling the WITH M UPDATE threshold; and,
   the M value changing since a pervious reassembly command.

7. The system of claim 6 wherein the initiator accepts a WITHOUT_M_UPDATE threshold, compares the fragment count to the WITHOUT_M_UPDATE threshold, and supplies reassembly commands in response to:
   the fragment count equaling the WITHOUT_M_UPDATE threshold; and,
   the M value not changing since a pervious reassembly command.

8. The system of claim 6 further comprising:
   a timer having a reset input responsive to reassembly commands from the initiator and an output to supply the elapsed time since a pervious reassembly command; and,
   wherein the initiator has an input to accept the elapsed time from the timer and an input to accept a timeout count, the initiator supplying reassembly commands in response to the elapsed time equaling the timeout count.

9. The method of claim 8
   wherein the initiator has an input to accept a WITHOUT_M_UPDATE threshold, the initiator comparing the fragment count to the WITH_M_UPDATE and WITHOUT_M_UPDATE thresholds and supplying reassembly commands in response to the following:
   the fragment count equaling the WITH_M_UPDATE threshold and the M value changing since the initiation of a pervious packet fragment reassembly;

the fragment count equaling the WITHOUT_M_UP-
DATE threshold and the M value not changing since a
pervious reassembly command; and,
the elapsed time equaling the timeout count.

10. The system of claim 9 wherein the value of the WITHOUT_M_UPDATE threshold exceeds the value of the WITH_M_UPDATE threshold.

11. In a multilink communication network, a method for initiating the reassembly of received packet fragments, the method comprising:
receiving packet fragments with corresponding sequence numbers;
counting the number of fragments received since the initiation of a pervious packet fragment reassembly;
tracking a RFC-1990 M value;
establishing a WITHOUT_M_UPDATE threshold;
initiating packet fragment reassembly in response to the fragment count equaling the WITHOUT_M_UPDATE threshold and the M value not changing since the initiation of a pervious packet fragment reassembly.

12. The method of claim 11 further comprising:
establishing a timeout count;
counting the elapsed time since the initiation of a pervious packet fragment reassembly; and,
wherein initiating packet fragment reassembly includes initiating packet fragment reassembly in response to the elapsed time equaling the timeout count.

* * * * *